: US 7,212,631 B2
(45) Date of Patent: May 1, 2007

(54) APPARATUS AND METHOD FOR PERFORMING KASUMI CIPHERING

(75) Inventors: Roberto Fabian Averbuj, San Diego, CA (US); Pradeep Kumar Mishra, San Diego, CA (US); Rajat Rajinderkumar Dhawan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 759 days.

(21) Appl. No.: 09/920,784

(22) Filed: Aug. 1, 2001

(65) Prior Publication Data

US 2002/0186841 A1 Dec. 12, 2002

Related U.S. Application Data

(60) Provisional application No. 60/294,958, filed on May 31, 2001.

(51) Int. Cl.
*H04L 9/00* (2006.01)
(52) U.S. Cl. .......................... 380/37; 380/259; 380/44
(58) Field of Classification Search .................. 380/44
See application file for complete search history.

(56) References Cited

U.S. PATENT DOCUMENTS 5,381,480 A * 1/1995 Butter et al. .................. 380/37
6,314,186 B1 * 11/2001 Lee et al. ..................... 380/28

FOREIGN PATENT DOCUMENTS

EP 0923062 6/1999

OTHER PUBLICATIONS

Specification of the 3GPP Confidentiality and Integrity Algorithms, Document 2: KASUMI Specification, Version 1.0, 3GPP, Dec. 23, 1999.*
Kuhn, U. "Cryptanalysis of reduced-round MISTY" Advances in Cryptology—Eurocrypt 2001, pp. 325-339.
3GPP Task Force "Specification of the 3GPP Confidentiality and Integrity Algorithms" ETSI/SAGE Specification, 1-24 (1999).

* cited by examiner

*Primary Examiner*—Gilberto Barron, Jr.
*Assistant Examiner*—Kristin D. Sandoval
(74) *Attorney, Agent, or Firm*—Thomas Rouse; Charles D. Brown; George C. Pappas

(57) ABSTRACT

Techniques for efficient KASUMI ciphering are disclosed. In one aspect, one KASUMI round for generating a fractional portion of the KASUMI cipher is deployed with appropriate feedback such that eight sequential rounds produce the KASUMI output. In another aspect, one third of the FO function is deployed with appropriate feedback such that three successive cycles produce the FO output. In yet another aspect, the FI function is deployed with appropriate feedback such that two subsequent cycles produce the FI output. In yet another aspect, a sub-key generator comprising two shift registers produces sub-keys for each round and sub-stage thereof in an efficient manner. These aspects, collectively, yield the advanced benefits of low area and low cost implementations of KASUMI with a simple user interface. Various other aspects of the invention are also presented.

15 Claims, 12 Drawing Sheets

∩ BITWISE AND OPERATION
∪ BITWISE OR OPERATION
⋘ ONE BIT LEFT ROTATION

FL FUNCTION

FO FUNCTION

FI FUNCTION

SUB-KEY GENERATOR

APPARATUS AND METHOD FOR PERFORMING KASUMI CIPHERING

CROSS-REFERENCE TO RELATED APPLICATIONS

This application claims the benefit of U.S. Provisional Application Ser. No. 60/294,958, filed May 31, 2001, the content of which is incorporated herein by reference in its entirety.

BACKGROUND

1. Field

The present invention relates generally to communications, and more specifically to a novel and improved method and apparatus for performing KASUMI ciphering.

2. Background

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the "TIA/EIA-98-C Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (4) the standard offered by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (5) some other standards. A system that implements the High Rate Packet Data specification of the cdma2000 standard is referred to herein as a high data rate (HDR) system. The HDR system is documented in TIA/EIA-IS-856, "CDMA2000 High Rate Packet Data Air Interface Specification". Proposed wireless systems also provide a combination of HDR and low data rate services (such as voice and fax services) using a single air interface.

Encryption techniques are commonly used to provide security for transmitted data, and to provide authentication for users attempting to access data. Encryption is used in a variety of fields, and is particularly useful for digital wireless communication systems.

One encryption algorithm, specified for use in the W-CDMA standard, is KASUMI. KASUMI is detailed in "Document 2: KASUMI Specification", of the ETSI/SAGE Specification "Specification of the 3GPP Confidentiality and Integrity Algorithms", version 1.0, dated Dec. 23, 1999 (hereinafter the KASUMI specification). Various uses of KASUMI are detailed in the same ETSI/SAGE specification, in "Document 1: f8 and f9 Specification". KASUMI is a block cipher that produces a 64-bit output from a 64-bit input utilizing a 128-bit key. The output of KASUMI can be used as a keystream to encrypt data, commonly by taking the exclusive-or (XOR) of bits of the keystream with bits of the data to be encrypted.

It is common in the art for communication systems to employ ASICs or other hardware solutions to implement various sub-functions thereof. In ASIC design, smaller utilized area translates to lower costs, higher yields, and often lower power. Low cost and power is beneficial in both fixed and mobile applications, but low power is particularly important in mobile devices which utilize batteries. At the same time, processing must be completed within certain time limits. Wireless data systems, such as W-CDMA systems, will need to incorporate KASUMI implementations into their subscriber and base stations, and designers will need to work within various constraints including those just described. As such, there is a need in the art for an apparatus or method that performs KASUMI ciphering in an efficient manner.

SUMMARY

Embodiments disclosed herein address the need for efficient apparatus or method for efficient KASUMI ciphering. In one aspect, one KASUMI round for generating a fractional portion of the KASUMI cipher is deployed with appropriate feedback such that eight sequential rounds produce the KASUMI output. In another aspect, one third of the FO function is deployed with appropriate feedback such that three successive cycles produce the FO output. In yet another aspect, the FI function is deployed with appropriate feedback such that two subsequent cycles produce the FI output. In yet another aspect, a sub-key generator comprising two shift registers produces sub-keys for each round and sub-stage thereof in an efficient manner. These aspects, collectively, yield the advanced benefits of low area and low cost implementations of KASUMI with a simple user interface. Various other aspects of the invention are also presented.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
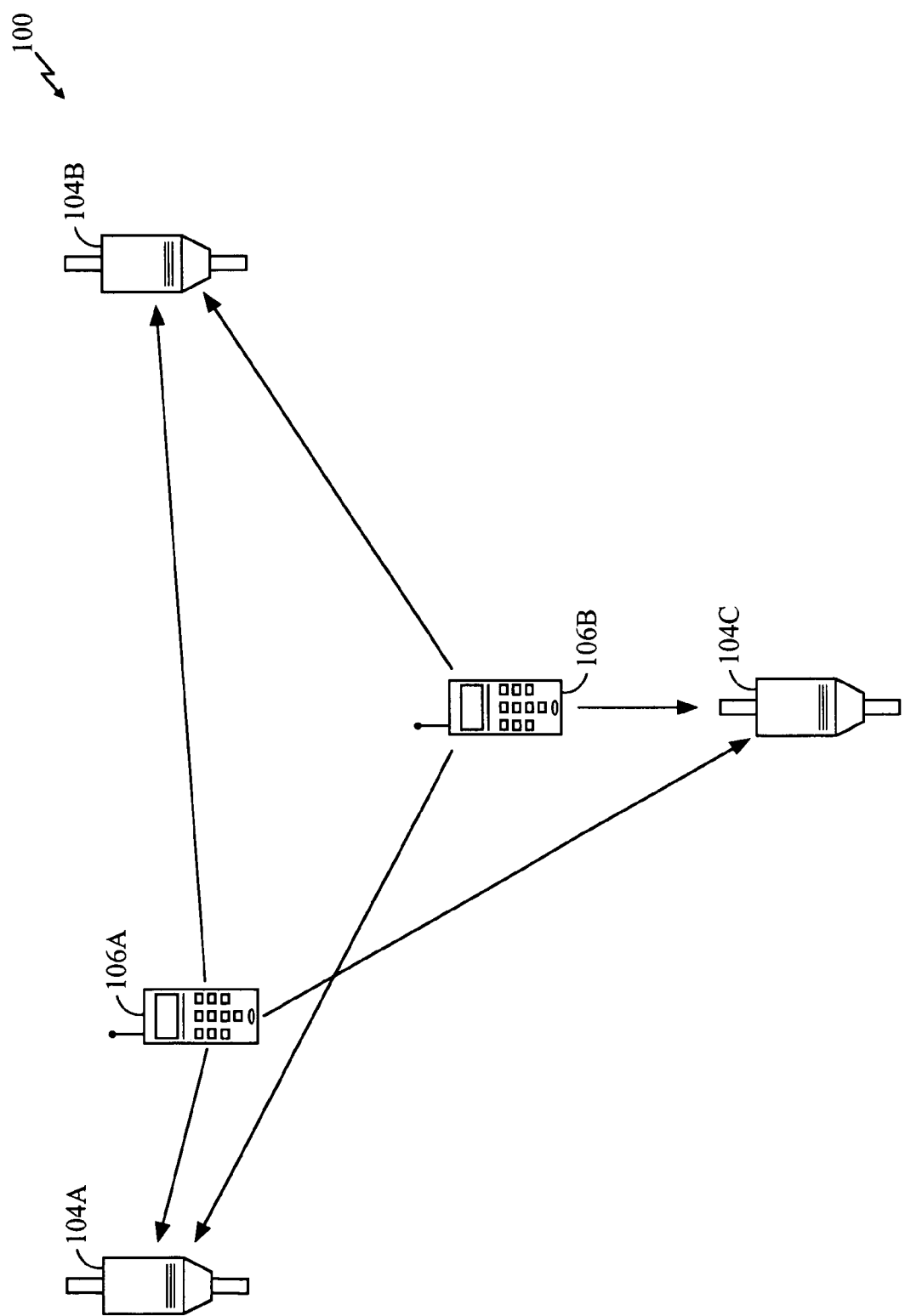
FIG. 1 is a general block diagram of a wireless communication system capable of supporting a number of users.

FIG. 1 is a diagram of a wireless communication system 100 that supports a number of users, and which can implement various aspects of the invention. System 100 may be designed to support one or more CDMA standards and/or designs (e.g., the IS-95 standard, the cdma2000 standard, the HDR specification, the W-CDMA standard). For simplicity, system 100 is shown to include three access points 104 (which may also be referred to as base stations) in communication with two access terminals 106 (which may also be referred to as remote terminals or mobile stations). The access point and its coverage area are often collectively referred to as a "cell". The KASUMI algorithm may be deployed in either one or more access points, one or more access terminals, or both.

Depending on the CDMA system being implemented, each access terminal 106 may communicate with one (or possibly more) access points 104 on the forward link at any given moment, and may communicate with one or more access points on the reverse link depending on whether or not the access terminal is in soft handoff. The forward link (i.e., downlink) refers to transmission from the access point to the access terminal, and the reverse link (i.e., uplink) refers to transmission from the access terminal to the access point.

Figures 2A, 2B, 2C, 2D:
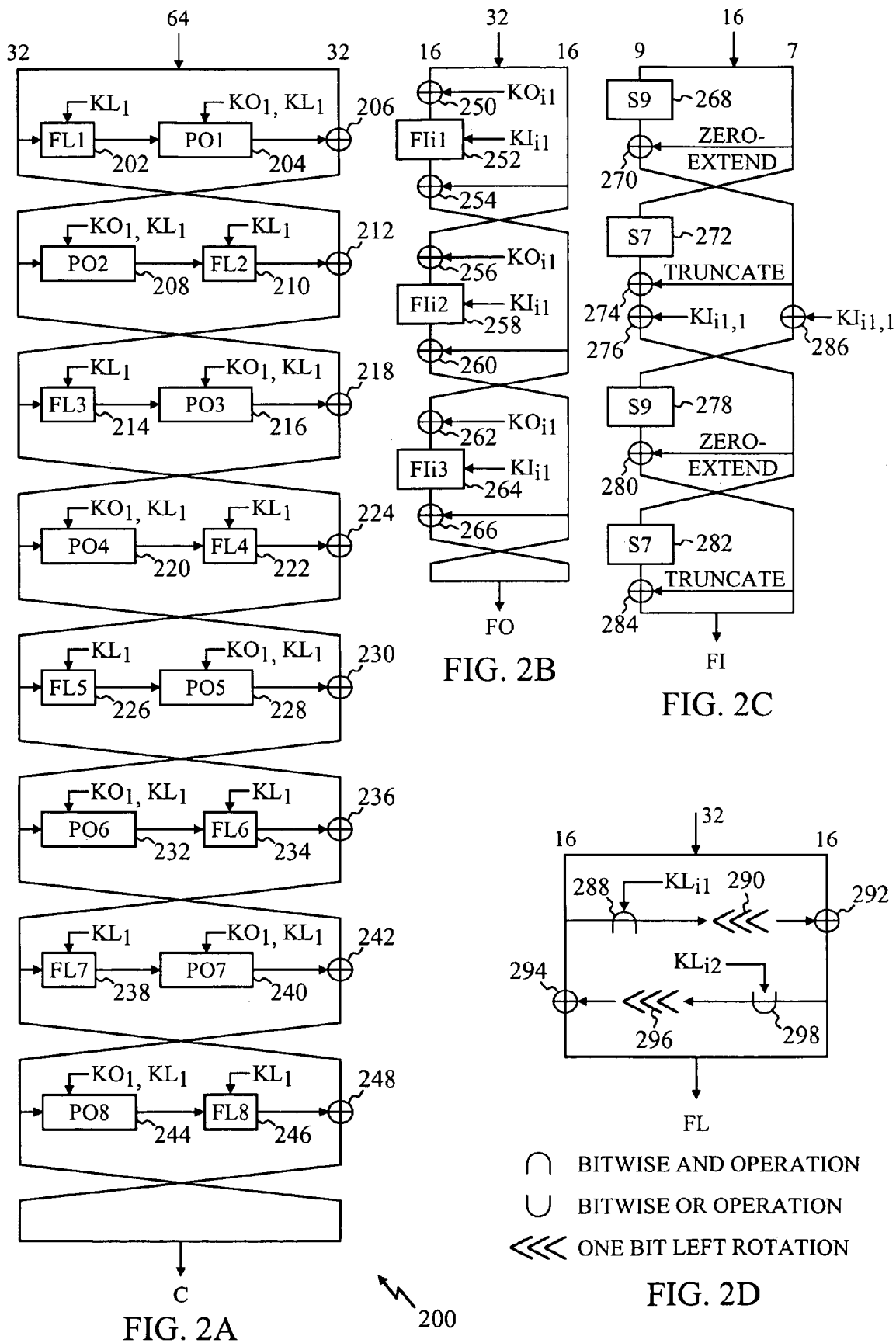
FIGS. 2A–2D depicts the calculations required to perform KASUMI.

FIGS. 2A–2D depict the KASUMI algorithm as defined in the KASUMI specification. FIG. 2A shows the top level diagram of KASUMI 200. FIG. 2B shows the FO function. FIG. 2C shows the FI function. FIG. 2D shows the FL function.

As shown in FIG. 2A, KASUMI consists of eight rounds. Each round is made up of one FL function, one FO function, and a 32-bit XOR function. The FL functions are denoted as FLi, where i signifies which round is represented and ranges from 1 to 8. Similarly, the FO functions are denoted as FOi. Each round utilizes various sub-keys, denoted as $KL_i$, $KO_i$, and $KI_i$. $KL_i$ is a 32-bit sub-key consisting of two 16-bit sub-keys denoted as $KL_{i,1}$ and $KL_{i,2}$. $KO_i$ and $KI_i$ are 48-bit sub-keys, each consisting of three 16-bit sub-keys denoted as $KO_{i,1}$, $KO_{i,2}$ and $KO_{i,3}$, $KI_{i,1}$, $KI_{i,2}$ and $KI_{i,3}$, respectively. The use of the 16-bit sub-keys will be described in further detail with respect to FIGS. 2B–2D, below.

Round 1 comprises FL1 202, FO1 204, and 32-bit, bitwise XOR 206. The 64 bit input is divided into two 32 bit segments, which will be described as a left segment and a right segment. The right segment is XORed in XOR 206 with the output of FO1 204 to produce a round 1 right output. The right output of each round serves as the left input to the subsequent round. Thus, the round 1 right output will be delivered as the left input to round 2. The left input segment is delivered to FL1 202, where it, utilizing sub-key $KL_1$, is processed according to the FL function, described below. The output of FL1 202 is delivered to FO1 204 for processing with $KO_1$ and $KI_1$ according to the FO function, also described below. As just mentioned, the output of FO1 204 is delivered to XOR 206 for bit-wise XORing with the right segment of the input. The left input segment will also be delivered as the right input to round 2. In general, the left input of each round will be used for various processing in that round, and will serve as the right input to the subsequent round.

Round 2 comprises FL2 208, FO2 210, and XOR 212. Round 2 is similar to round 1 except that the order of functions FO and FL is reversed. In general, the odd numbered rounds will have the FL function feeding the FO function, and the even numbered rounds will have the FO function feeding the FL function. The right input to round 2 is XORed in XOR 212 with the output of FL2 210 to produce a round 2 right output. As before, the round 2 right output will be delivered as the left input to round 3. The left input segment is delivered to FO2 208 for processing with $KO_2$ and $KI_2$ according to the FO function. The output of FO2 208 is delivered to FL2 210 for processing with $KL_2$ according to the FL function. The left input segment will also be delivered as the right input to round 3.

Rounds 3, 5, and 7 are configured similar to round 1, except, of course, that the inputs to each round come from the outputs of the previous round, rather than the KASUMI input. Rounds 4, 6, and 8 are configured similar to round 2.

In round 3, the output of XOR 212 is delivered to FL3 214 for processing with $KL_3$ according to the FL function. The output of FL3 214 is delivered to FO3 216 for processing with $KO_3$ and $KI_3$ according to the FO function. The output of FO3 216 is delivered to XOR 218 for bitwise XORing with the output of XOR 206.

In round 4, the output of XOR 218 is delivered to FO4 220 for processing with $KO_4$, and $KI_4$ according to the FO function. The output of FO4 220 is delivered to FL4 222 for processing with $KL_4$ according to the FL function. The output of FL4 222 is delivered to XOR 224 for bitwise XORing with the output of XOR 212.

In round 5, the output of XOR 224 is delivered to FL5 226 for processing with $KL_5$ according to the FL function. The output of FL5 226 is delivered to FO5 228 for processing with $KO_5$ and $KI_5$ according to the FO function. The output of FO5 228 is delivered to XOR 230 for bitwise XORing with the output of XOR 218.

In round 6, the output of XOR 230 is delivered to FO6 232 for processing with $KO_6$, and $KI_6$ according to the FO function. The output of FO6 232 is delivered to FL6 234 for processing with $KL_6$ according to the FL function. The output of FL6 234 is delivered to XOR 236 for bitwise XORing with the output of XOR 224.

In round 7, the output of XOR 236 is delivered to FL7 238 for processing with $KL_7$ according to the FL function. The output of FL7 238 is delivered to FO7 240 for processing with $KO_7$ and $KI_7$ according to the FO function. The output of FO7 240 is delivered to XOR 242 for bitwise XORing with the output of XOR 230.

In round 8, the output of XOR 242 is delivered to FO8 244 for processing with $KO_8$, and $KI_8$ according to the FO function. The output of FO8 244 is delivered to FL8 246 for processing with $KL_8$ according to the FL function. The output of FL8 246 is delivered to XOR 248 for bitwise XORing with the output of XOR 236.

The output of XOR 248 and the output of XOR 242 are concatenated to produce the 64-bit KASUMI output, labeled C in FIG. 2A.

FIG. 2B depicts the calculation steps to perform the FO function described above. The FO function takes a 32-bit input and separates it into two 16-bit segments, the left input and right input, respectively. Note that the FO function contains three stages, each containing two 16-bit bitwise XORs and an instance of the function FIi, denoted FIi1, FIi2, and FIi3, respectively, described in detail below. In this description i corresponds to the round number, since there is one FO function in each round described above with respect to FIG. 2A.

In the first stage of function FO, the left 16-bit input is bitwise XORed in XOR 250 with the 16 bit sub-key $KO_{i,1}$.

$KO_{i,1}$, as described above, is a 16-bit sub-key of the 48-bit sub-key $KO_i$. $KO_{i,2}$ and $KO_{i,3}$, are also 16-bit sub-keys of $KO_i$. The output of XOR 250 is delivered to FIi1 252 for processing with $KI_{i,1}$, according to the FI function described below. $KI_{i,1}$, as described above, is a 16-bit sub-key of the 48-bit sub-key $KI_i$. $KI_{i,2}$ and $KI_{i,3}$, are also 16-bit sub-keys of $KI_i$. The output of FIi1 252 is delivered to XOR 254 for 16-bit bitwise XORing with the right input.

In the second stage of function FO, the right input is delivered to XOR 256 for 16-bit bitwise XORing with sub-key $KO_{i,2}$. The result is delivered to FIi2 258 for processing with $KI_{i,2}$, according to the FI function. The output of FIi2 258 is delivered to XOR 260 for 16-bit bitwise XORing with the output of XOR 254.

In the third stage of function FO, the output of XOR 254 is delivered to XOR 262 for 16-bit bitwise XORing with sub-key $KO_{i,3}$. The result is delivered to FIi3 264 for processing with $KI_{i,3}$, according to the FI function. The output of FIi3 264 is delivered to XOR 266 for 16-bit bitwise XORing with the output of XOR 260. The output of XOR 260 is concatenated with the output of XOR 266 to produce the output of the function, labeled FO in FIG. 2B.

FIG. 2C depicts the calculation steps to perform the FI function described above. The FI function takes a 16-bit input and separates it into a 9-bit segment and a 7-bit segment. The FI function contains two stages with identical processing, with an XOR step between the two stages, identified as XORs 276 and 286. Note that the darker lines in FIG. 2C are used to identify 9-bit paths, and the lighter lines identify 7-bit paths.

In the first stage, the 9-bit input segment is delivered to function S9 268 for processing, described in further detail below. The 7-bit input segment is zero extended and XORed in XOR 270 with the output of S9 268. The 7-bit input segment is also delivered to function S7 272 for processing, described in further detail below. The 9-bit output of XOR 270 is truncated to seven bits and XORed with the output of S7 272 in XOR 274.

In XOR 276, the output of XOR 274 is bitwise XORed with sub-key $KI_{i,j,1}$. $KI_{i,j,1}$ is a 7-bit sub-key of $KI_{i,j}$, where i indicates the round number, j indicates the FO stage number from which the FI function is called, and 1 indicates that it is the first sub-key of $KI_{i,j}$. In XOR 286, the output of XOR 270 is bitwise XORed with 9-bit sub-key $KI_{i,j,2}$. $KI_{i,j,2}$ is the second sub-key of $KI_{i,j}$.

The outputs of XORs 276 and 286 serve as the inputs to the second stage of function FI. The 9-bit output of XOR 286 is delivered to function S9 278 for processing. The 7-bit output of XOR 276 is zero extended and XORed in XOR 280 with the output of S9 278. The output of XOR 276 is also delivered to function S7 282. The 9-bit output of XOR 280 is truncated to seven bits and XORed with the output of S7 282 in XOR 284. The 7-bit output of XOR 284 is concatenated with the 9-bit output of XOR 280 to form the 16-bit output, labeled FI.

Function S7 is defined in the KASUMI specification. It takes a 7-bit input and returns a 7-bit output. Equations 1–7 below define each output bit, y0 through y6, as a function of the seven input bits, x0 through x6. The concatenation of two operands, such as x1x3, indicates the logical AND of the operands (i.e. x1 AND x3). The symbol $\oplus$ denotes the exclusive OR function.

$$y0 = x1x3 \oplus x4 \oplus x0x1x4 \oplus x5 \oplus x2x5 \oplus x3x4x5 \oplus x6 \oplus x0x6 \oplus x1x6 \oplus x3x6 \oplus x2x4x6 \oplus x1x5x6 \oplus x4x5x6 \quad (1)$$

$$y1 = x0x1 \oplus x0x4 \oplus x2x4 \oplus x5 \oplus x1x2x5 \oplus x0x3x5 \oplus x6 \oplus x0x2x6 \oplus x3x6 \oplus x4x5x6 \oplus 1 \quad (2)$$

$$y2 = x0 \oplus x0x3 \oplus x2x3 \oplus x1x2x4 \oplus x0x3x4 \oplus x1x5 \oplus x0x2x5 \oplus x0x6 \oplus x0x1x6 \oplus x2x6 \oplus x4x6 \oplus 1 \quad (3)$$

$$y3 = x1 \oplus x0x1x2 \oplus x1x4 \oplus x3x4 \oplus x0x5 \oplus x0x1x5 \oplus x2x3x5 \oplus x1x4x5 \oplus x2x6 \oplus x1x3x6 \quad (4)$$

$$y4 = x0x2 \oplus x3 \oplus x1x3 \oplus x1x4 \oplus x0x1x4 \oplus x2x3x4 \oplus x0x5 \oplus x1x3x5 \oplus x0x4x5 \oplus x1x6 \oplus x3x6 \oplus x0x3x6 \oplus x5x6 \oplus 1 \quad (5)$$

$$y5 = x2 \oplus x0x2 \oplus x0x3 \oplus x1x2x3 \oplus x0x2x4 \oplus x0x5 \oplus x2x5 \oplus x4x5 \oplus x1x6 \oplus x1x2x6 \oplus x0x3x6 \oplus x3x4x6 \oplus x2x5x6 \oplus 1 \quad (6)$$

$$y6 = x1x2 \oplus x0x1x3 \oplus x0x4 \oplus x1x5 \oplus x3x5 \oplus x6 \oplus x0x1x6 \oplus x2x3x6 \oplus x1x4x6 \oplus x0x5x6 \quad (7)$$

Function S9 is defined in the KASUMI specification. It takes a 9-bit input and returns a 9-bit output. Equations 8–16 below define each output bit, y0 through y8, as a function of the nine input bits, x0 through x8. The concatenation of two operands, such as x0x2, indicates the logical AND of the operands (i.e. x0 AND x2). The symbol $\oplus$ denotes the exclusive OR function.

$$y0 = x0x2 \oplus x3 \oplus x2x5 \oplus x5x6 \oplus x0x7 \oplus x1x7 \oplus x2x7 \oplus x4x8 \oplus x5x8 \oplus x7x8 \oplus 1 \quad (8)$$

$$y1 = x1 \oplus x0x1 \oplus x2x3 \oplus x0x4 \oplus x1x4 \oplus x0x5 \oplus x3x5 \oplus x6 \oplus x1x7 \oplus x2x7 \oplus x5x8 \oplus 1 \quad (9)$$

$$y2 = x1 \oplus x0x3 \oplus x3x4 \oplus x0x5 \oplus x2x6 \oplus x3x6 \oplus x5x6 \oplus x4x7 \oplus x5x7 \oplus x6x7 \oplus x8 \oplus x0x8 \oplus 1 \quad (10)$$

$$y3 = x0 \oplus x1x2 \oplus x0x3 \oplus x2x4 \oplus x5 \oplus x0x6 \oplus x1x6 \oplus x4x7 \oplus x0x8 \oplus x1x8 \oplus x7x8 \quad (11)$$

$$y4 = x0x1 \oplus x1x3 \oplus x4 \oplus x0x5 \oplus x3x6 \oplus x0x7 \oplus x6x7 \oplus x1x8 \oplus x2x8 \oplus x3x8 \quad (12)$$

$$y5 = x2 \oplus x1x4 \oplus x4x5 \oplus x0x6 \oplus x1x6 \oplus x3x7 \oplus x4x7 \oplus x6x7 \oplus x5x8 \oplus x6x8 \oplus x7x8 \oplus 1 \quad (13)$$

$$y6 = x0 \oplus x2x3 \oplus x1x5 \oplus x2x5 \oplus x4x5 \oplus x3x6 \oplus x4x6 \oplus x5x6 \oplus x7 \oplus x1x8 \oplus x3x8 \oplus x5x8 \oplus x7x8 \quad (14)$$

$$y7 = x0x1 \oplus x0x2 \oplus x1x2 \oplus x3 \oplus x0x3 \oplus x2x3 \oplus x4x5 \oplus x2x6 \oplus x3x6 \oplus x2x7 \oplus x5x7 \oplus x8 \oplus 1 \quad (15)$$

$$y8 = x0x1 \oplus x2 \oplus x1x2 \oplus x3x4 \oplus x1x5 \oplus x2x5 \oplus x1x6 \oplus x4x6 \oplus x7 \oplus x2x8 \oplus x3x8 \quad (16)$$

FIG. 2D depicts the FL function described above with respect to FIG. 2A. The 32-bit input is divided into two 16-bit segments, a left segment and a right segment. The left input segment is bitwise ANDed with $KL_{i,1}$ in AND gate 288, denoted by the $\cap$ symbol. The output of AND gate 288 is rotated left by one bit in rotator 290, denoted by the <<< symbol. The output of rotator 290 is bitwise XORed with the right input segment in XOR 292. The output of XOR 292 is bitwise ORed in OR gate 298, denoted by the $\cup$ symbol. The output of OR gate 298 is rotated left by one bit in rotator 296. The output of rotator 296 is bitwise XORed with the left input segment in XOR 294. The 32-bit output, denoted FL, is formed by concatenating the output of XOR 294 with the output of XOR 292.

Figure 3:
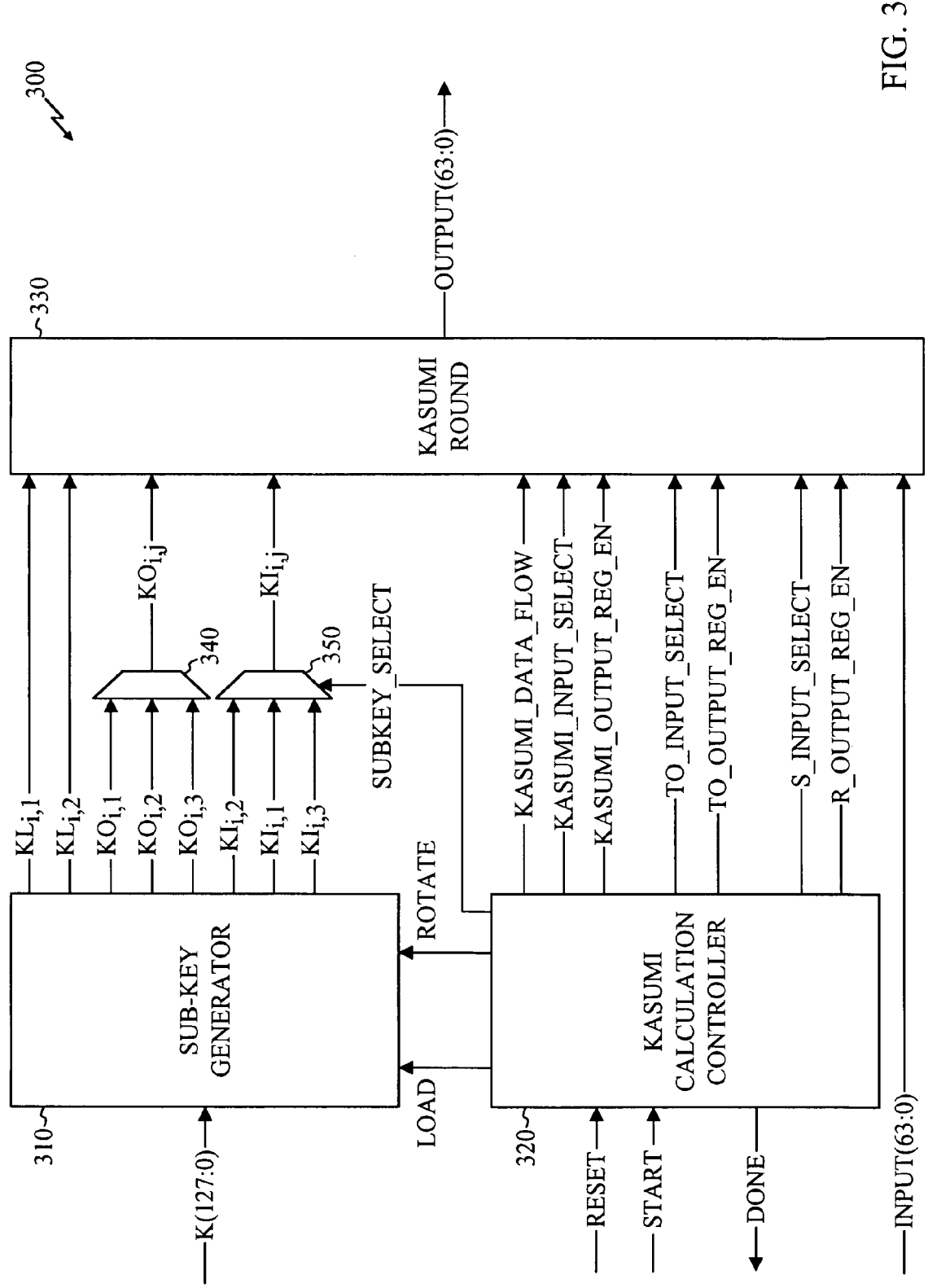
FIG. 3 is a general block diagram of an embodiment for performing KASUMI.

The KASUMI algorithm requires eight rounds of calculation to produce the desired result, as just described. In one embodiment, hardware for a single round is deployed and reused with the appropriate feedback to produce the eight-round KASUMI output. FIG. 3 depicts such an exemplary embodiment. The word "exemplary" is used exclusively herein to mean "serving as an example, instance, or illustration." Any embodiment described herein as "exemplary" is not necessarily to be construed as preferred or advantageous over other embodiments.

FIG. 3 depicts KASUMI 300, which comprises sub-key generator 310, KASUMI round 330, and KASUMI calculation controller 320. KASUMI round 330 receives sub-keys from sub-key generator 310. $KL_{i,1}$ and $KL_{i,2}$ are connected directly, and $KO_{i,j}$ and $KI_{i,j}$ are delivered through muxes 340 and 350, respectively. Mux 340 receives $KO_{i,1}$, $KO_{i,2}$, and $KO_{i,3}$ from sub-key generator 310. Mux 350 receives $KI_{i,1}$, $KI_{i,2}$, and $KI_{i,3}$ from sub-key generator 310. The set of subkeys, $KO_{i,j}$ and $KI_{i,j}$, to be delivered to KASUMI round 330 from muxes 340 and 350, respectively, is determined via the control signal, subkey_select, from KASUMI calculation controller 320. All of the sub-keys are generated in sub-key generator 310 from a key input, labeled K, which is 128 bits in length. Sub-key generator 310 also receives a load signal and a rotate signal from KASUMI calculation controller 320. Sub-key generation will be detailed more fully below.

KASUMI calculation controller 320 receives as inputs a reset signal and a start signal. It produces a done signal to indicate that the KASUMI output has been generated. Such a signal to indicate completion is optional. Alternative embodiments may eliminate such a signal if the completion time is known based on characteristics of the system. The start signal in the exemplary embodiment is synchronized such that key, K, and the 64-bit input are valid when the start signal is strobed. Various signals are shown in FIG. 3 for controlling the operation of KASUMI round 330. Kasumi_data_flow, kasumi_input_select, and kasumi_output_reg_en are used to control the round-level functioning within KASUMI round 330. Fo_input_select and fo_output_reg_en are used to control the FO function within KASUMI round 330. Fi_input_select and fi_output_reg_en are used to control the FI function within KASUMI round 330. In the exemplary embodiment, these last two signals are identical so only a single control signal is needed to control the FI function. Subsets of these signals may be needed depending on how various embodiments are deployed. Various signaling schemes for controlling memory and feedback circuits are known in the art and are within the scope of the present invention. Detailed description of the control required is provided below.

KASUMI ROUND 330 receives, in addition to the control signals and sub-keys just mentioned, a 64-bit input upon which a 64-bit output is generated (the calculation of which was detailed in reference to FIGS. 2A–2D).

Figure 4:
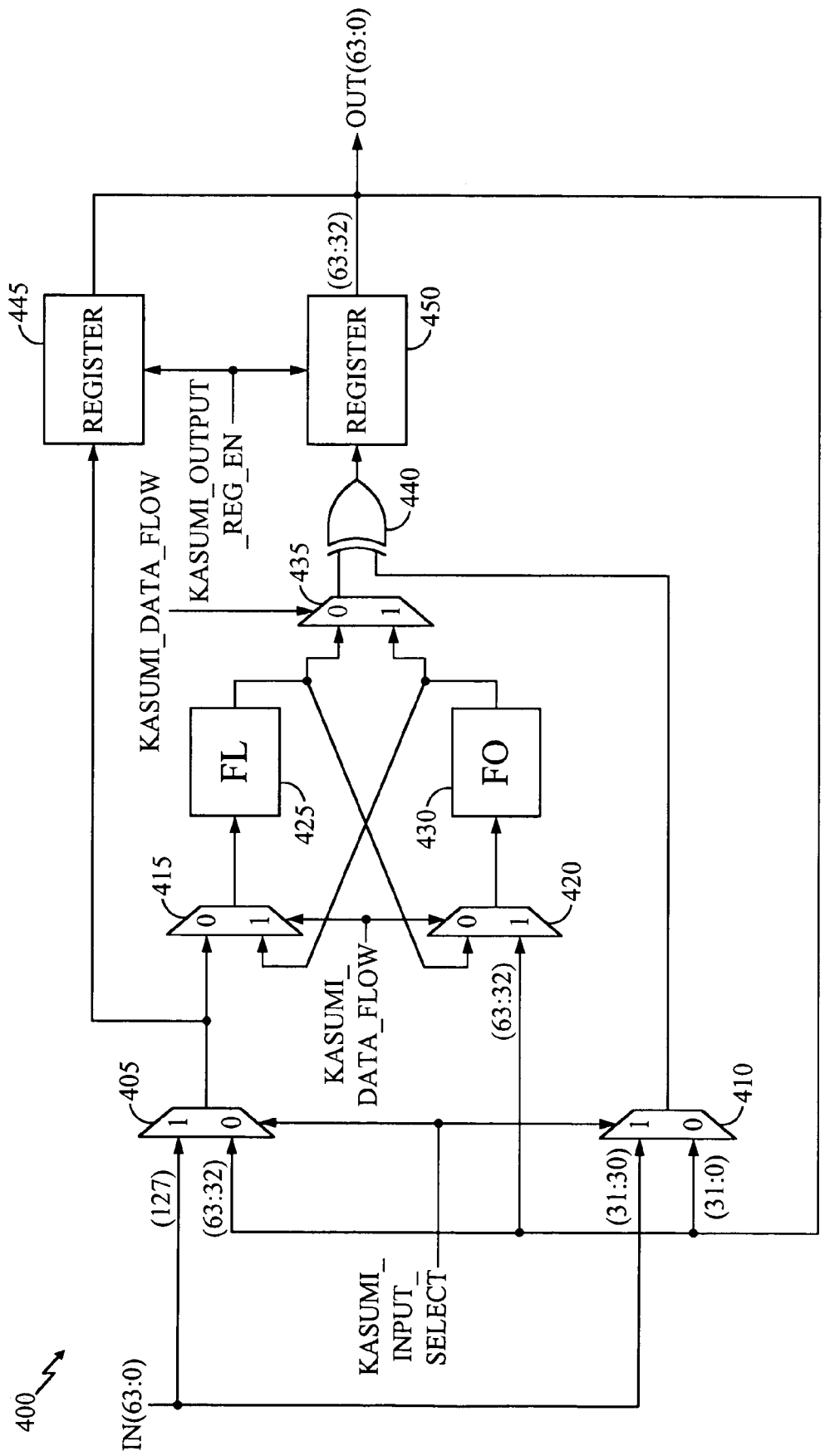
FIG. 4 is a block diagram of an embodiment of a KASUMI round.

FIG. 4 depicts KASUMI round 400, which is an exemplary embodiment of KASUMI round 330, just described. In KASUMI round 400, the 64-bit input, in, is divided into two 32-bit segments, the upper half (63:32) and the lower half (31:0). The upper half is connected to an input of mux 405. The lower half is connected to an input of mux 410. Two registers 445 and 450 latch results computed in KASUMI round 400 when kasumi_output_reg_en is asserted, and the outputs of the registers 445 and 450 are concatenated to produce the 64-bit output, out. In addition, the output of register 445 is fed back as an input to mux 410 and the output of register 450 is fed back as an input to mux 405. The muxes 405 and 410 are controlled by kasumi_input_select, which causes in to be selected when not asserted and the feedback results to be selected when asserted. Muxes 405 and 410 operate together as a selector for selecting between the input and the contents of the memory formed by registers 445 and 450. In this manner, the KASUMI round 400 can be utilized to perform the first round of KASUMI, when in is selected, and subsequent rounds of KASUMI when the previous round's results are fed back.

The heart of the processing of a KASUMI round, as described in relation to FIGS. 2A–2D above, is carried out in the FL function 425, the FO function 430, and the XOR 440. However, as described above, while the functions are each used in every round, the processing order differs from round to round. Three muxes, 415, 420, and 435, provide the switching needed to reuse the components in each subsequent round of KASUMI. The FL function 425, the FO function 430, the XOR 440, and the muxes 415, 420, and 435 together form one embodiment of a partial round calculator. The output of the partial round calculator, which is comprised of the input to mux 415 delivered from the output of mux 405, concatenated with the output of XOR 440, is stored in the memory formed by registers 445 and 450. The input to the partial round calculator comes from the output of the selector formed by muxes 405 and 410. Numerous circuit implementations of a selector, partial round calculator, and memory, as just described, will be readily apparent to those skilled in the art. Each of these embodiments is within the scope of the present invention.

The three muxes, 415, 420, and 435, make up a data flow selector for configuring the KASUMI round for even and odd round calculations. They are all controlled by the selector signal kasumi_data_flow. Mux 415 selects the output of mux 405 when kasumi_data_flow is asserted, and selects the fed back output of function FO 430 when kasumi_data_flow is deasserted. Mux 420 selects the output of register 445 when kasumi_data_flow is deasserted, and selects the fed back output of function FL 425 when kasumi_data_flow is asserted. The output of mux 415 is delivered to function FL 425, the output of which is delivered to mux 435. The output of mux 420 is delivered to function FO 430, the output of which is also delivered to mux 435. Mux 435 selects the output of function FL 425 when kasumi_data_flow is deasserted, and selects the output of function FO 430 when kasumi_data_flow is asserted. The output of mux 435 is delivered as in input to bitwise XOR 440. The other input of bitwise XOR 440 is the output of mux 410. The input to register 450, described above, is the output of XOR 440. The input to register 445, described above, is the output of mux 405. Those skilled in the art will recognize that the configuration depicted in FIG. 4, coupled with the appropriate manipulations of control signals kasumi_input_select, kasumi_data_flow, and kasumi_output_reg_en, can be used to implement the required KASUMI calculations described with respect to FIG. 2A above. The control signaling for this embodiment will be described in further detail below.

Figure 5:
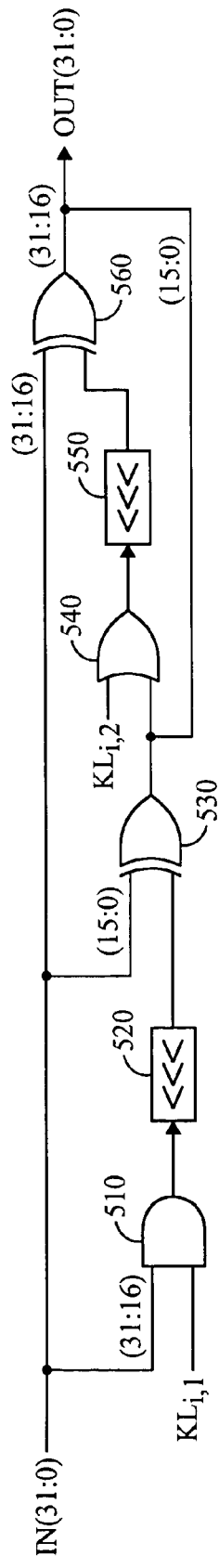
FIG. 5 is a block diagram of an embodiment of the FL function.

FIG. 5 depicts an embodiment of the FL function 500, suitable for use as function FL 425 described in FIG. 4 above. FL function 500 receives a 32-bit input, in, and produces a 32-bit output, out. The upper half (bits 31 through 16) of in are bitwise ANDed with sub-key $KL_{i,1}$ in AND gate 510. The output of AND gate 510 is rotated one bit left in rotator 520. The output of rotator 520 is bitwise XORed with the lower half (bits 15 through 0) of the input in XOR 530. The results of XOR 530 are bitwise ORed with sub-key $KL_{i,2}$ in OR gate 540. The output of OR gate 540 is rotated left one bit in rotator 550. The output of rotator 550 is bitwise XORed with the upper half of the input in XOR 560. The output of XOR 560 is concatenated with the output of XOR 530 to produce the 32-bit output, out.

Figure 6:
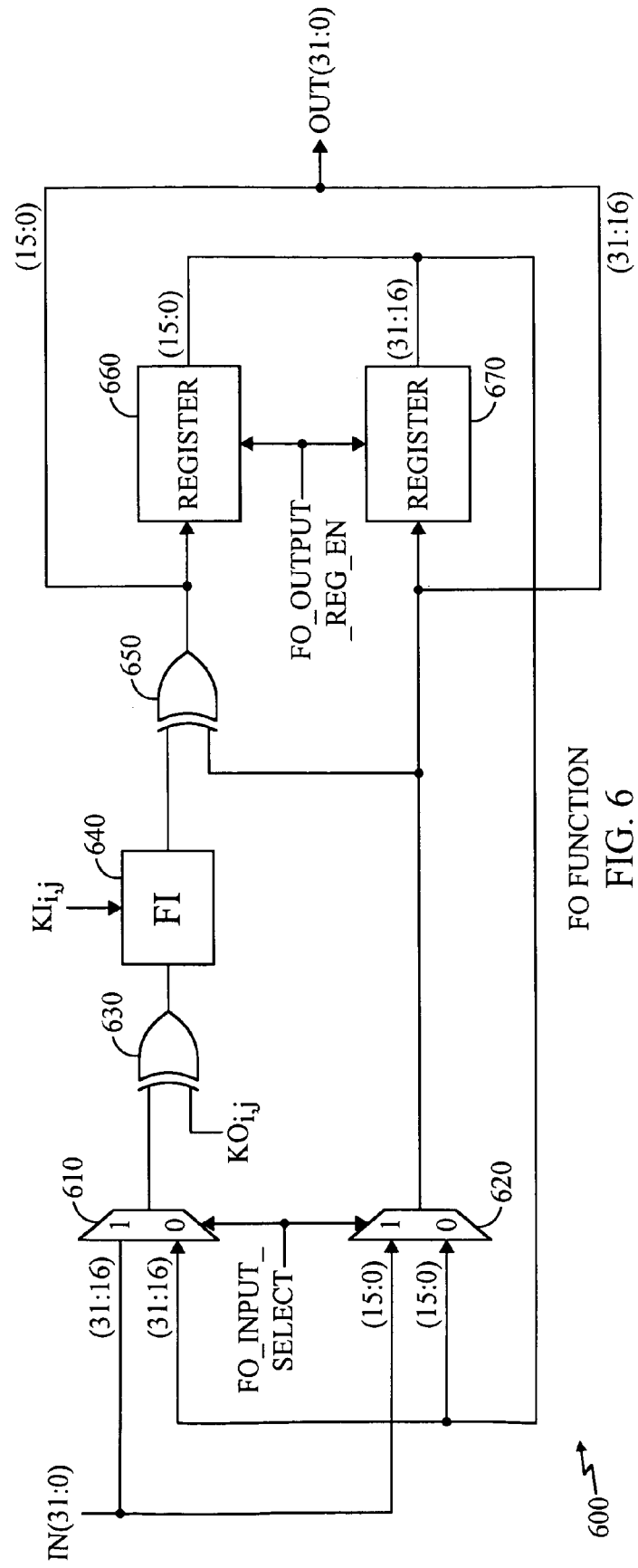
FIG. 6 is a block diagram of an embodiment of the FO function.

FIG. 6 depicts an embodiment of the FO function 600, suitable for use as function FO 430 described in FIG. 4 above. FO function 600 receives a 32-bit input, in, and produces a 32-bit output, out. In this embodiment, components for one of the three FO stages, described above, are deployed. Registers and appropriate feedback allow the single stage to be used sequentially three times to produce the FO output.

The two registers 660 and 670 are used to store the intermediate calculations, when fo_output_reg_en is asserted. The output of register 660 is delivered as an input to mux 620. The output of register 670 is delivered as an input to mux 610. The upper half of input, in, serves as the other input to mux 610. The lower half of input, in, serves as the other input to mux 620. Signal fo_input_select directs muxes 610 and 620 to select between the input, in, and the fed back values from the registers 660 and 670, respectively. The output of mux 610 is bitwise XORed with sub-key $KO_{i,j}$ in XOR 630. The output of XOR 630 is delivered to function FI 640, to be processed with sub-key $KI_{i,j}$, as described in further detail below. The output of function FI 640 is bitwise XORed with the output of mux 620 in XOR 650. The output of XOR 650 is delivered as the input to register 660, described above. The output of mux 620 is delivered as the input to register 670, described above. The output of mux 620 is concatenated with the output of XOR 650 to form the 32-bit output, out.

Registers 660 and 670 form a memory. Muxes 610 and 620 form a selector. XOR 630, FI function 640, and XOR 650 form a partial FO calculator. The selector selects between the input and the memory results for delivering the input to the partial FO calculator. The output of the partial FO calculator is stored in the memory. Numerous circuit implementations of a selector, partial FO calculator, and memory, as just described, will be readily apparent to those skilled in the art. Each of these embodiments is within the scope of the present invention.

Figure 7:
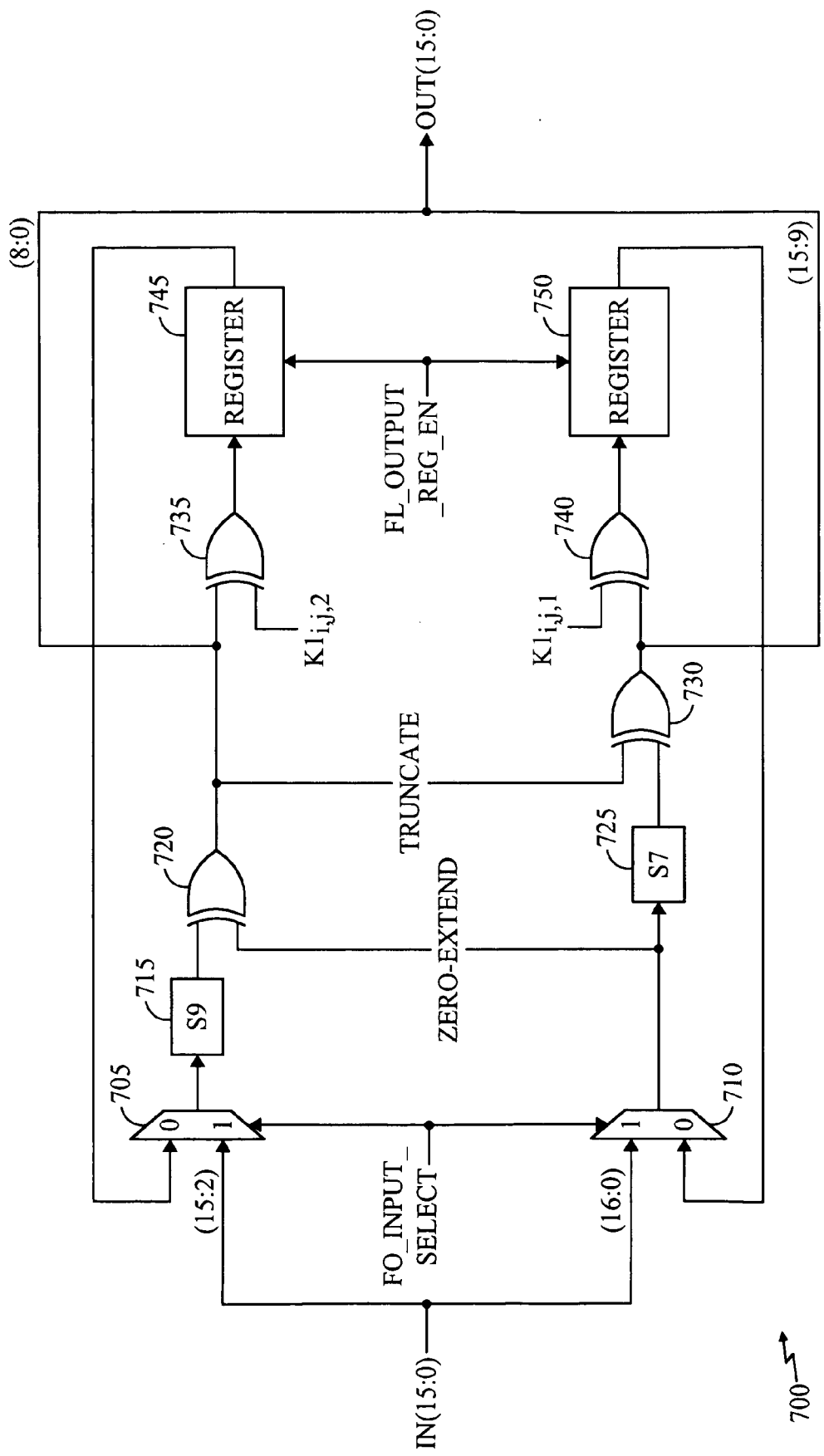
FIG. 7 is a block diagram of an embodiment of the FI function.

FIG. 7 depicts an embodiment of the FI function 700, suitable for use as function FI 640 described in FIG. 6 above. FI function 700 receives a 16-bit input, in, and produces a 16-bit output, out. In this embodiment, components for one of the two FI stages, described above, are deployed. Registers and appropriate feedback allow the single stage to be used sequentially twice to produce the FI output.

The two registers 745 and 750 are used to store the intermediate calculations, when fi_output_reg_en is asserted. The output of 9-bit register 745 is delivered as an input to mux 705. The output of 7-bit register 750 is delivered as an input to mux 710. The upper nine bits of the input, in, serves as the other input to mux 705. The lower seven bits of input, in, serves as the other input to mux 710. Signal fi_input_select directs muxes 705 and 710 to select between the input, in, and the fed back values from the registers 745 and 750, respectively. The output of mux 705 is delivered for processing in function S9 715, described above. The output of function S9 715 is bitwise XORed with the zero-extended output of mux 710 in XOR 720. The output of mux 710 is also delivered for processing in function S7 725. The output of function S7 725 is bitwise XORed with the truncated output of XOR 720 in XOR 730. The output of XOR 720 is bitwise XORed with sub-key $KI_{i,j,2}$ in XOR 735. The output of XOR 730 is bitwise XORed with sub-key $KI_{i,j,1}$ in XOR 740. The output of XOR 735 is delivered as the input to register 745, described above. The output of XOR 740 is delivered as the input to register 750, described above. The output of XOR 730 is concatenated with the output of XOR 720 to produce the 16-bit output, out.

Note that in this embodiment, the signals fi_input_select and fi_output_reg_en are identical, so a common signal can be shared between mux 705, mux 710, register 745, and register 750. In alternate embodiments, when each FI processing cycle corresponds to one cycle of the clock controlling registers 745 and 750, then an enable signal is not needed on those registers. The registers simply delay the results of XORs 735 and 740 by one cycle in which they are used to calculate the second half of FI. Various techniques such as these can be employed and are well known in the art.

Registers 745 and 750 form a memory. Muxes 705 and 710 form a selector. Function S9 715, XOR 720, function S7 725, and XORs 730, 735, and 740 form a partial FI calculator. The selector selects between the input and the memory results for delivering the input to the partial FI calculator. The output of the partial FI calculator, an intermediate value, is stored in the memory. In addition, the output of XORs 720 and 730 also serve as the FI output. Numerous circuit implementations of a selector, partial FI calculator, and memory, as just described, will be readily apparent to those skilled in the art. Each of these embodiments is within the scope of the present invention.

Figure 8:
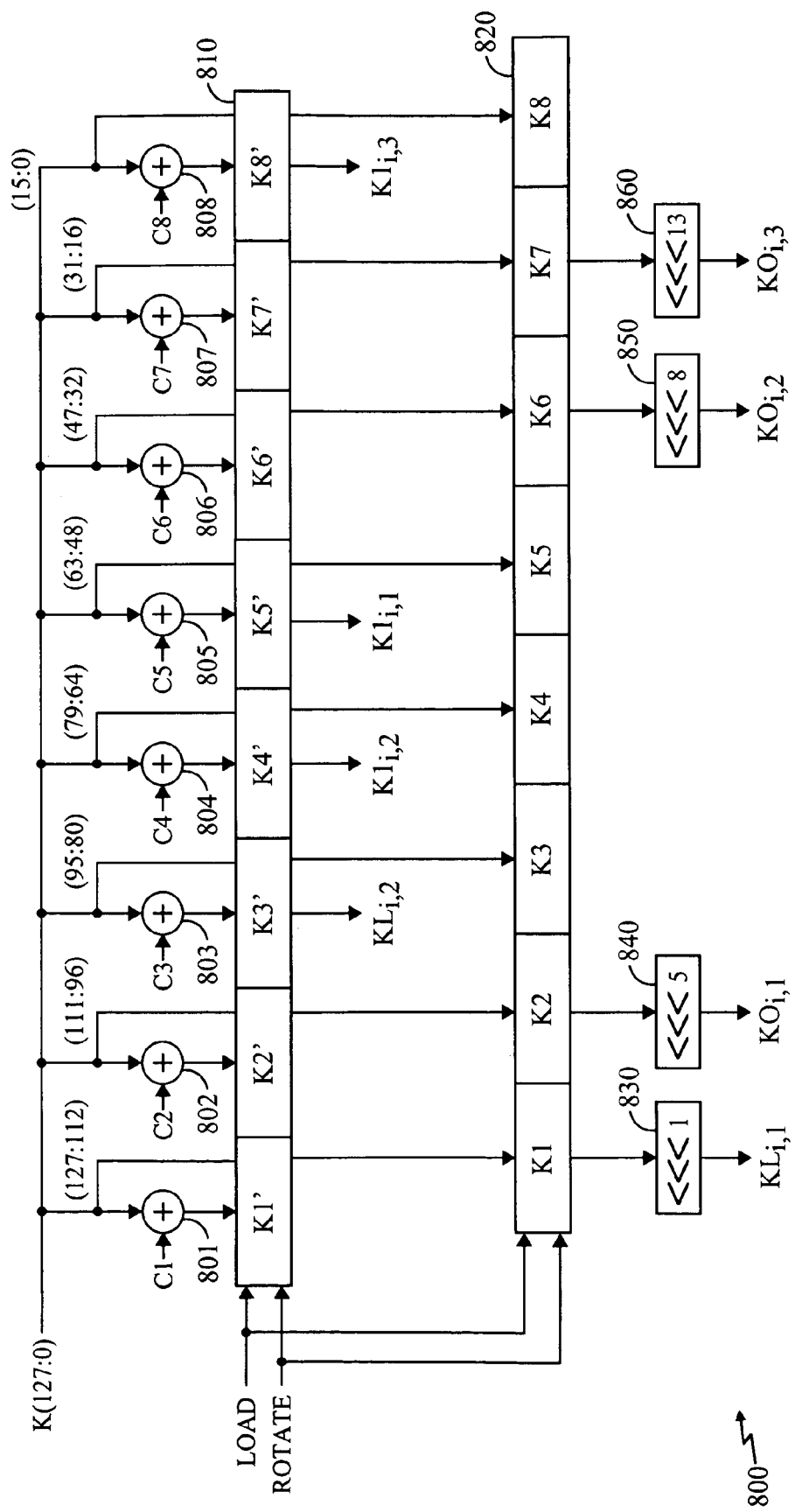
FIG. 8 is a block diagram of a sub-key generator.

FIG. 8 depicts sub-key generator 800. Sub-key generator 800 receives a 128-bit key, K, and produces the various sub-keys described above in conjunction with the load and rotate signals. Sub-key generator 800 contains two 128-bit shift registers 810 and 820. Each of these is parallel-loadable when the load signal is asserted, and each performs an 8-bit left rotation when the rotate signal is asserted. The load signal is asserted once at the beginning of a KASUMI calculation. The rotate signal is enabled after each round is completed to create new sub-keys for the next round. A more detailed description of these control signals in relation to the other control signals is given below.

Note that numerous ways to implement these rotatable shift registers will be readily apparent to those skilled in the art. For example, a shift register can be made into a rotating shift register by feeding back the shifted out bit as the input to the first stage. Such a rotating shift register can be shifted eight times to produce the 8-bit left rotation. Alternatively, the shift register can be wired such that each shift rotates each bit by eight positions (or byte-wise left rotation). This alternative is equivalent to implementing eight interleaved 16 bit shift registers, configured with their outputs fed back to their respective inputs.

Shift register 820 consists of 8 16-bit sections labeled K1 through K8. K(127:112) serves as the load input for K1. K(111:96) serves as the load input for K2. K(95:80) serves as the load input for K3. K(79:64) serves as the load input for K4. K(63:48) serve load input for K6. K(31:16) serves as the load input for K7. K(15:0) serves as the load input for K8.

Shift register 810 consists of 8 16-bit sections labeled K1' through K8'. The load inputs for shift register 810 are formed by bitwise XORing various segments of K with constants C1 through C8, which are defined in the KASUMI specification. Table 1 provides the values of these constants.

TABLE 1

| | |
|---|---|
| C1 | 0x0123 |
| C2 | 0x4567 |
| C3 | 0x89AB |
| C4 | 0xCDEF |
| C5 | 0xFEDC |
| C6 | 0xBA98 |
| C7 | 0x7654 |
| C8 | 0x3210 |

The load input to K1' is generated by bitwise XORing K(127:112) with C1 in XOR 801. The load input to K2' is generated by bitwise XORing K(111:96) with C2 in XOR

802. The load input to K3' is generated by bitwise XORing K(95:80) with C3 in XOR 803. The load input to K4' is generated by bitwise XORing K(79:64) with C4 in XOR 804. The load input to K5' is generated by bitwise XORing K(63:48) with C5 in XOR 805. The load input to K6' is generated by bitwise XORing K(47:32) with C6 in XOR 806. The load input to K7' is generated by bitwise XORing K(31:16) with C7 in XOR 807. The load input to K8' is generated by bitwise XORing K(15:0) with C8 in XOR 808. Of course, since each XOR 801–808 has a constant as one of the operands, each of the 128 XORs can be replaced by a wire when the corresponding constant is a "0" and an inverter when the corresponding constant is a "1".

Some of the sub-keys are tapped directly from shift register 810. $KL_{i,2}$ is tapped from K3'. $KI_{i,2}$ is tapped from K4'. $KI_{i,1}$ is tapped from K5'. $KI_{i,3}$ is tapped from K8'. Other sub-keys are generated by rotating various segments of shift-register 820. $KL_{i,1}$ is generated by rotating K1 left by one bit in rotator 830. $KO_{i,1}$ is generated by rotating K2 left by five bits in rotator 840. $KO_{i,2}$ is generated by rotating K6 left by eight bits in rotator 850. $KO_{i,3}$ is generated by rotating K7 left by thirteen bits in rotator 860. Note that since each of these rotators rotates by a constant value, each rotation can be accomplished through simple wire-mapping. Those skilled in the art will recognize how such wire-mapping is to be implemented, and will recognize various other techniques for rotation as well.

Figure 9:
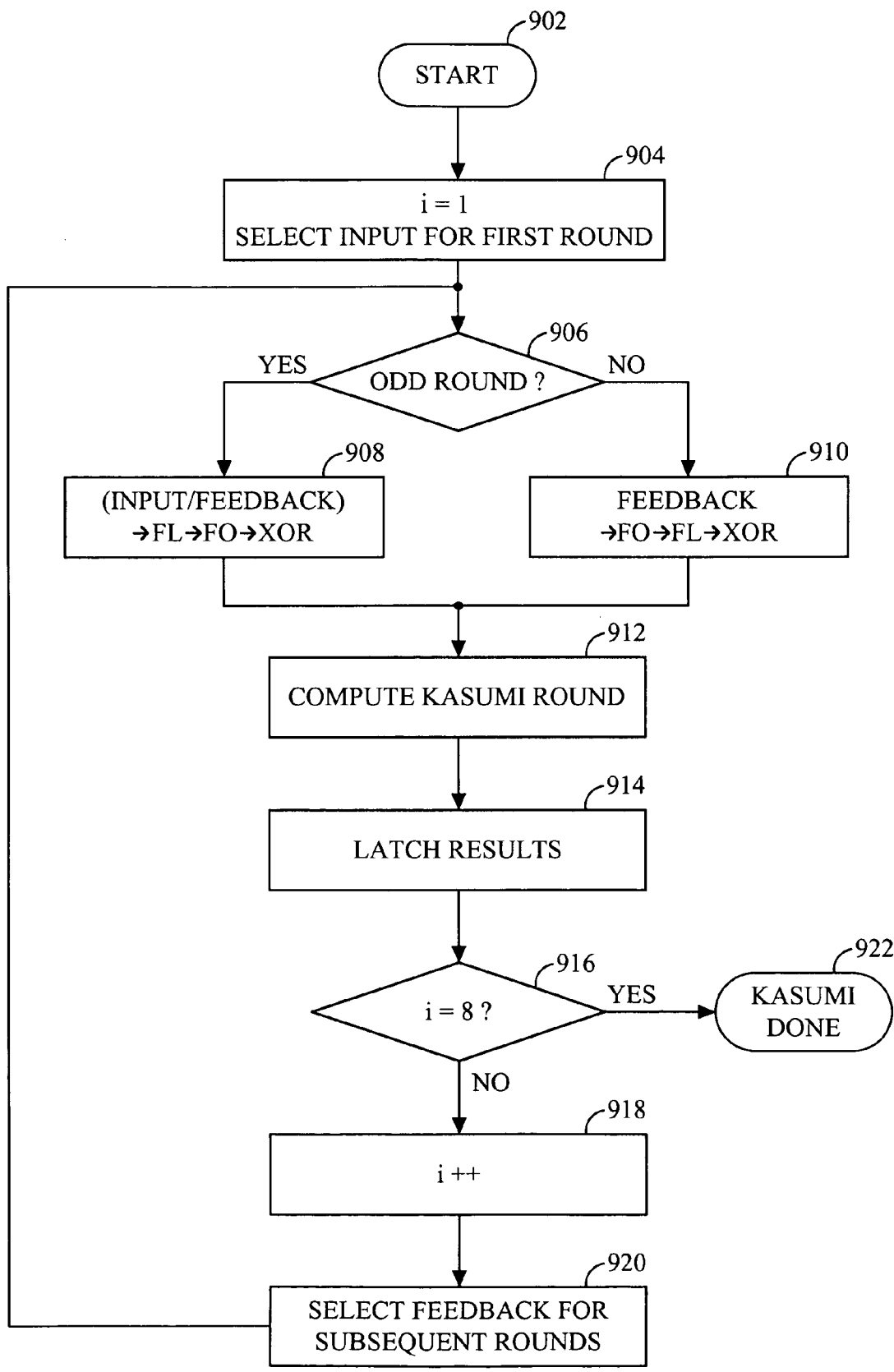
FIG. 9 is a flowchart of one embodiment of KASUMI.

FIG. 9 is a flowchart detailing steps performed in one embodiment of KASUMI. In addition, these steps can be utilized by KASUMI calculation controller 320 if an embodiment such as that described with respect to FIG. 3 is deployed. These steps can also be applied to an embodiment such as KASUMI round 400 described with respect to FIG. 4.

The process begins at start 902, which proceeds to block 904. In block 904, i is set to 1, where i signifies the round number. The input to the KASUMI round is selected for computing the round, since this is round one. This corresponds to setting kasumi_input _select to zero, as shown in FIG. 4. Proceed to block decision block 906, where a test is performed to determine if the current round, denoted by i, is even or odd. If i is odd, i.e. 1, 3, 5, or 7, then proceed to block 908. If i is even, i.e. 2, 4, 6, or 8, then proceed to block 910.

In block 908, the data flow of the KASUMI round is configured to flow from the input (in round one) or the feedback (in rounds three, five and seven) to the FL function to the FO function to the XOR gate. This corresponds to setting kasumi_data_flow to one in FIG. 4.

In block 910, the data flow of the KASUMI round is configured to flow from the feedback to the FO function to the FL function to the XOR gate. This corresponds to setting kasumi_data_flow to zero in FIG. 4.

From either block 908 or 910, proceed to block 912 to compute the KASUMI round. One embodiment for computing a KASUMI round is detailed in FIG. 4, but any method for computing a KASUMI round is within the scope of the flowchart of FIG. 9. Once the KASUMI round is computed, the results are stored in the latch results block 914. This corresponds to asserting the kasumi_reg_en signal shown in FIG. 4. Proceed to decision block 916.

In decision block 916, if i equals eight, then the eighth and final round has been performed, and the process is completed in KASUMI done block 922. In an embodiment employing a done signal, such as that shown in FIG. 3, that signal can be asserted at this point. When i is less than eight, there are additional rounds to be performed, so i is incremented by one in block 918. Proceed to block 920 where the feedback, from the latched results of block 914, is selected for computing the next round. This corresponds to setting kasumi_input_select to one in FIG. 4. Loop back to decision block 906, to perform the next round. Repeat the steps until KASUMI done block 922 is reached.

Figure 10:
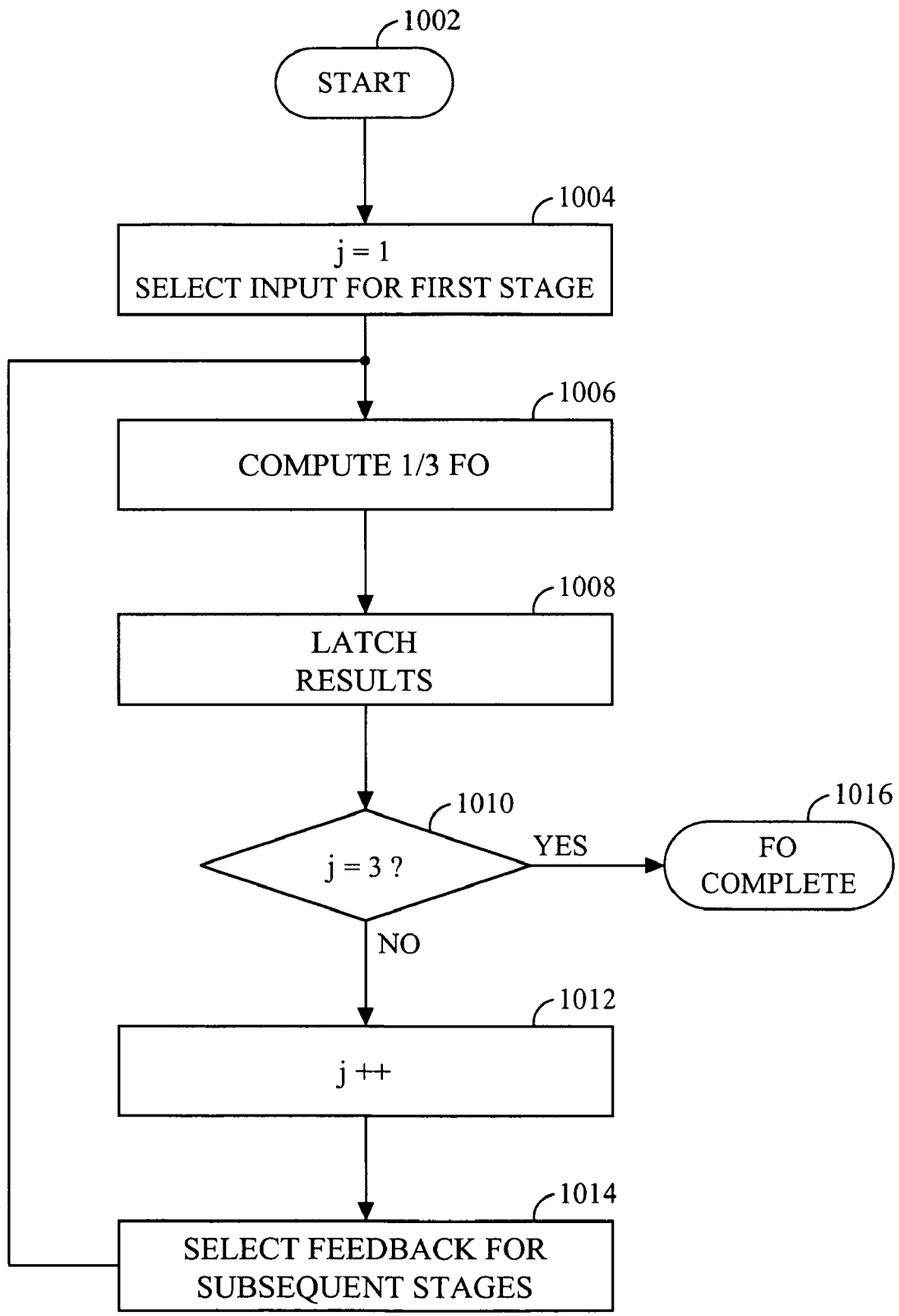
FIG. 10 is a flowchart of one embodiment of function FO.

FIG. 10 is a flowchart detailing the steps performed in one embodiment of the FO function. In addition, these steps can be utilized by KASUMI calculation controller 320 if an embodiment such as that described with respect to FIG. 3 is deployed. These steps can also be applied to an embodiment such as FO function 600 described with respect to FIG. 6.

The process begins at start 1002, which proceeds to block 1004. In block 1004, j is set to 1, where j signifies the stage number. The input to the FO function is selected for computing, since this is stage one. This corresponds to setting fo_input_select to one, as shown in FIG. 6. Furthermore, the stage number, j, correlates with the signal subkey_select shown in FIG. 3. (In some embodiments, subkey_select values of 0, 1, and 2 correspond to j values of 1, 2, and 3. Alternatively, a three input mux can be deployed which selects based on subkey_select values of 1, 2, and 3, identical to the j value.)

Proceed to block 1006, where one third of the FO function is computed. One embodiment capable of computing one third of an FO function is depicted in FIG. 6, but others are also within the scope of the flowchart of FIG. 10. The results of the one-third calculation are stored in latch results block 1008. This corresponds to asserting fo_output_en in FIG. 6. Then proceed to decision block 1010 to test if j is equal to 3. If it is, then proceed to FO complete block 1016, the FO function has been completed. If j is less than three, then more stages are yet to be completed. Proceed to block 1012 to increment j by one. Then proceed to block 1014, where feedback, the results latched in block 1008, is selected as the input to the FO function. This corresponds to setting fo_input_select to zero in FIG. 6. Loop back to block 1006 to calculate the next stage, and repeat the process until all the stages are completed.

Figure 11:
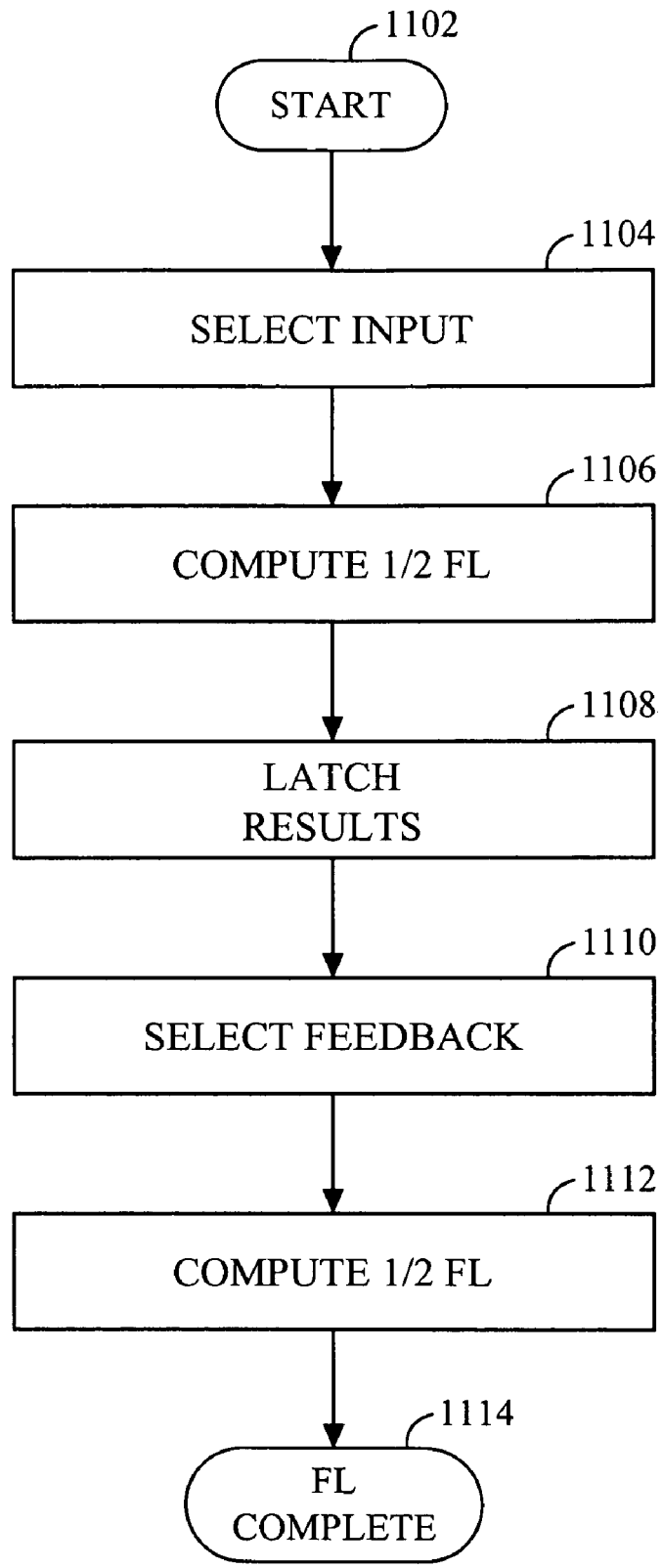
FIG. 11 is a flowchart of one embodiment of function FI.

FIG. 11 is a flowchart detailing the steps performed in one embodiment of the FI function. In addition, these steps can be utilized by KASUMI calculation controller 320 if an embodiment such as that described with respect to FIG. 3 is deployed. These steps can also be applied to an embodiment such as FI function 700 described with respect to FIG. 7.

The process begins at start 1102, which proceeds to block 1104. In block 1104, the input is selected for computing, which corresponds to setting fi_input_select to one in FIG. 7. Proceed to block 1106 where one half of the FI function is computed. Proceed to block 1108 to latch the results of the first half of FI, calculated in block 1106. Proceed to block 1110, where feedback is selected for computing, which corresponds to setting fi_input_select to zero in FIG. 7. Proceed to block 1112 where the second half of FI is computed. Proceed to block 1114, FI computing is complete.

Figure 12:
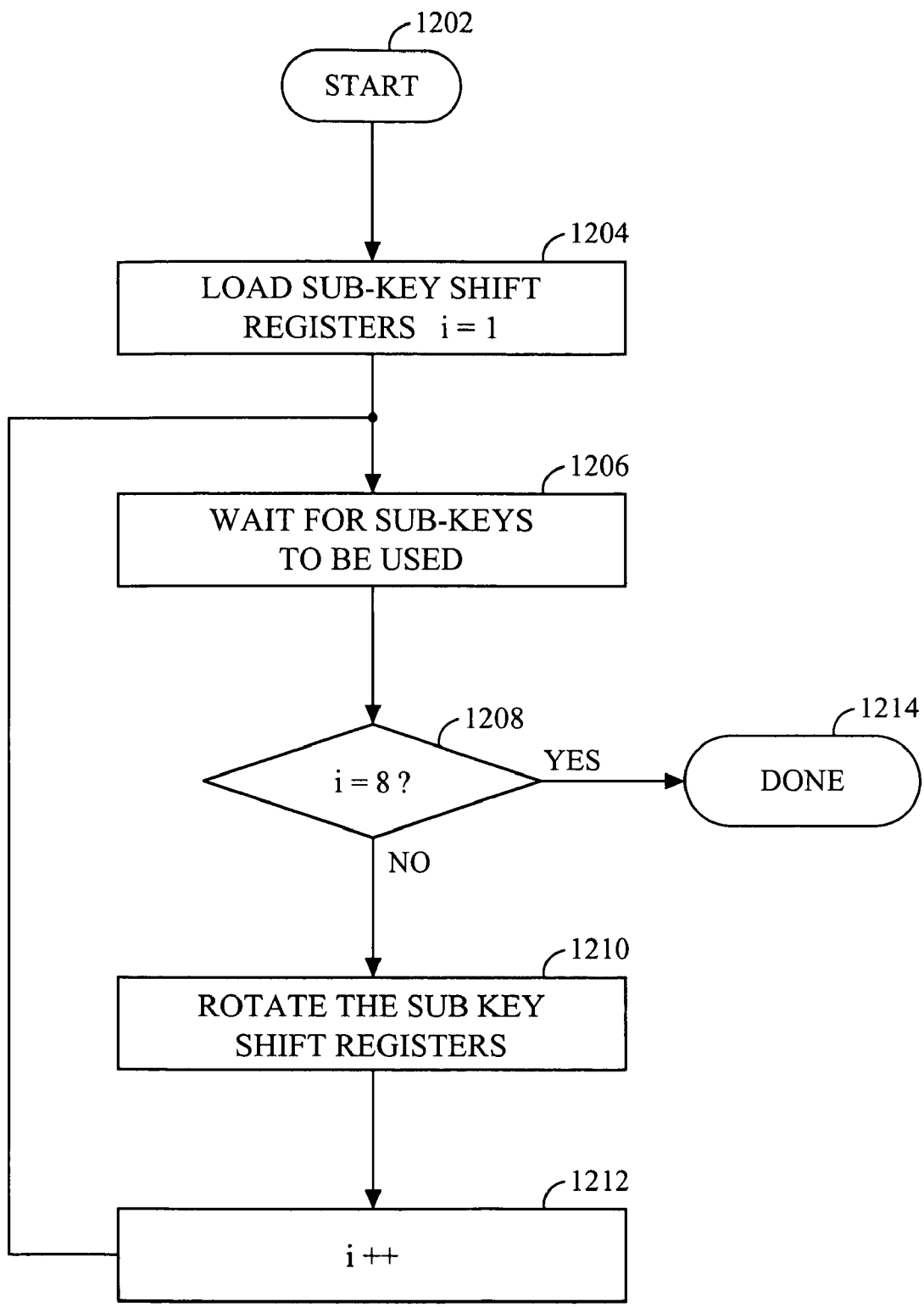
FIG. 12 is a flowchart of one embodiment of a sub-key generator.

FIG. 12 is a flowchart detailing steps performed for controlling an embodiment of a sub-key generator, such as the one described above with respect to FIG. 8. In addition, these steps can be utilized by KASUMI calculation controller 320 if an embodiment such as that described with respect to FIG. 3 is deployed.

The process begins at start 1202, which proceeds to block 1204. In block 1204, i is set to 1, where i signifies the round number. The sub-key shift registers are loaded. For example, the load signal in FIG. 3 may connect to a sub-key generator 800, shown in FIG. 8, that, when asserted, loads the two shift registers 810 and 820. Proceed to block 1206 and wait for the current set of sub-keys to be used, which will commonly be the time required for one KASUMI round to transpire. During this time, one set of sub-keys, corresponding to round one will be in effect. Proceed to decision block 1208.

In decision block 1208, if i equals eight, then the eighth and final KASUMI round has been performed, and the process is completed in done block 1214. If another KASUMI computation is required, proceed back to start 1202. When i is less than eight, there are additional rounds needing new sets of sub-keys. Proceed to block 1210 to rotate the sub-key shift registers. This corresponds to asserting the rotate signal in FIG. 3, and causes 8-bit left rotations in shift registers 810 and 820, as described above in relation to FIG. 8. Proceed to block 1212 to increment i by one. Loop back to block 1206 to provide sub-keys for another KASUMI round. Repeat the steps until done block 1214 is reached.

Figure 13:
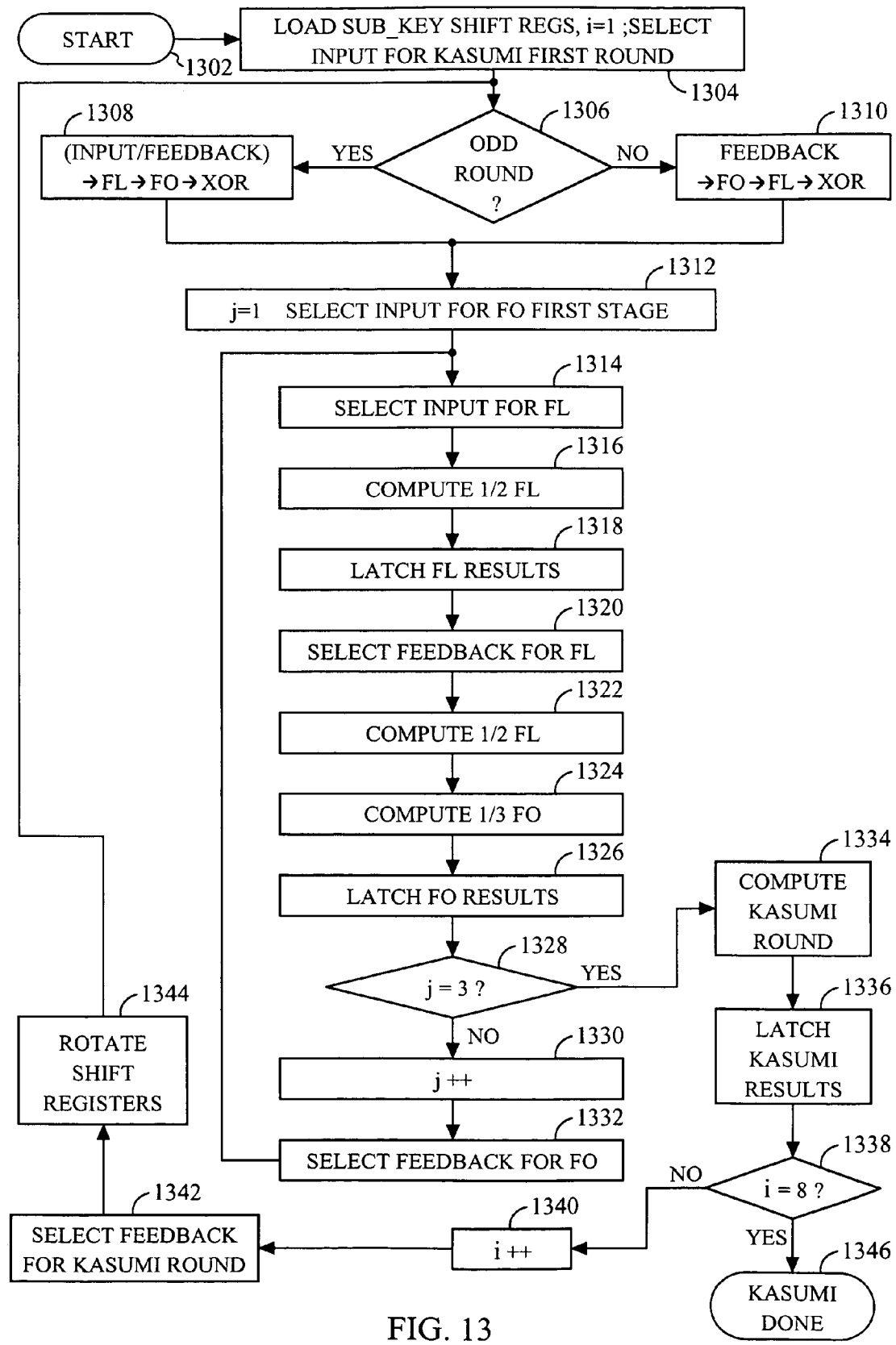
FIG. 13 diagrams the control flow for an alternative embodiment of KASUMI.

FIG. 13 is a flowchart depicting the steps to perform KASUMI incorporating the techniques described with respect to FIGS. 3–8 and the flowcharts in FIGS. 9–12 described above. An exemplary embodiment using the steps of FIG. 13 is KASUMI 300, described in FIG. 3 above. An exemplary KASUMI 300 may employ KASUMI calculation controller 320 which performs the control steps described in FIG. 13 in conjunction with sub-key generator 310 and KASUMI round 330. Sub-key generator 310 may be one such as sub-key generator 800, described in FIG. 8. KASUMI round 330 may be one such as KASUMI round 400, described in FIG. 8. KASUMI round 400 may employ FL function 500 and FO function 600, described in FIGS. 5 and 6, respectively. FO function 600 may employ FI function 700, described in FIG. 7. The flowchart in FIG. 13 begins at start 1302 and proceeds to block 1304.

In block 1304, i is set to 1, where i signifies the round number. The input to the KASUMI round is selected for computing the round, since this is round one. This corresponds to setting kasumi_input_select to zero, as shown in FIG. 4. The sub-key shift registers are loaded. For example, the load signal in FIG. 3 may connect to a sub-key generator 800, shown in FIG. 8, that, when asserted, loads the two shift registers 810 and 820.

Proceed to decision block 1306, where a test is performed to determine if the current round, denoted by i, is even or odd. If i is odd, i.e. 1, 3, 5, or 7, then proceed to block 1308. If i is even, i.e. 2, 4, 6, or 8, then proceed to block 1310. In block 1308, the data flow of the KASUMI round is configured to flow from the input (in round one) or the feedback (in rounds three, five and seven) to the FL function to the FO function to the XOR gate. This corresponds to setting kasumi_data_flow to one in FIG. 4. In block 1310, the data flow of the KASUMI round is configured to flow from the feedback to the FO function to the FL function to the XOR gate. This corresponds to setting kasumi_data_flow to zero in FIG. 4.

From either block 1308 or 1310, proceed to block 1312 to begin computing the KASUMI round. The sub-functions of the round are described first, such as the stages of FI and FO, but as those skilled in the art will know, these method steps can be interchanged without departing from the scope of the invention.

In block 1312, the FO function is initialized. J is set to 1, where j signifies the stage number. The input to the FO function is selected for computing the FO function, since this is FO stage one. This corresponds to setting fo_input_select to one, as shown in FIG. 6. Furthermore, the stage number, j, correlates with the signal subkey_select shown in FIG. 3. The correlation between subkey_select and j was described in detail above with respect to FIG. 10. Proceed to block 1314 to perform the FI function.

In block 1314, the input is selected for computing the FI function, which corresponds to setting fi_input_select to one in FIG. 7. Proceed to block 1316 where one half of the FI function is computed. One embodiment capable of computing one half of an FI function is depicted in FIG. 7, but others are also within the scope of the flowchart of FIG. 13. Proceed to block 1318 to latch the results of the first half of FI, calculated in block 1316. Proceed to block 1320, where FI feedback is selected for computing the FI function, which corresponds to setting fi_input_select to zero in FIG. 7. Proceed to block 1322 where the second half of FI is computed. Proceed to block 1324 to continue with FO processing, FI computing is complete.

In block 1324, one third of the FO function is computed. One embodiment capable of computing one third of an FO function is depicted in FIG. 6, but others are also within the scope of the flowchart of FIG. 13. The results of the one-third calculation are stored in latch FO results block 1326. This corresponds to asserting fo_output_en in FIG. 6. Then proceed to decision block 1328 to test if j is equal to 3. If it is, then FO processing is complete. Proceed to block 1334 to continue KASUMI processing. If j is less than three, then more stages are yet to be completed. Proceed to block 1330 to increment j by one. Then proceed to block 1332, where feedback, the FO results latched in block 1326, is selected as the input to the FO function. This corresponds to setting fo_input_select to zero in FIG. 6. Loop back to block 1314 to calculate the next stage, and repeat the process until all the stages are completed.

In block 1334, compute the KASUMI round. One embodiment for computing a KASUMI round is detailed in FIG. 4, but any method for computing a KASUMI round is within the scope of the flowchart of FIG. 13. Once the KASUMI round is computed in block 1334, the results are stored in the latch KASUMI results block 1336. This corresponds to asserting the kasumi_reg_en signal shown in FIG. 4. Proceed to decision block 1338.

In decision block 1338, if i equals eight, then the eighth and final round has been performed, and the process is completed in KASUMI done block 1346. In an embodiment employing a done signal, such as that shown in FIG. 3, that signal can be asserted at this point. When i is less than eight, there are additional rounds to be performed, so i is incremented by one in block 1340. Proceed to block 1342 where the feedback, the latched results of block 1336, is selected for computing the next round. This corresponds to setting kasumi_input_select to one in FIG. 4. The next round will need a new set of sub-keys, so proceed to block 1344 to rotate the sub-key shift registers. This corresponds to asserting the rotate signal in FIG. 3, and causes 8-bit left rotations in shift registers 810 and 820, as described above in relation to FIG. 8. Loop back to decision block 1306, to perform the next round. Repeat the steps until KASUMI done block 1346 is reached.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus, operable to perform KASUMI ciphering on a KASUMI input with a key to produce a KASUMI output, comprising:
    a calculation controller for generating a first control signal and a second control signal;
    a KASUMI round circuit for generating a fractional portion of a KASUMI cipher, configurable in response to the first control signal for calculation of even and odd rounds to produce the KASUMI output;
    memory for storing the output of the KASUMI round circuit; and
    a selector for providing the input to the KASUMI round circuit in response to the second control signal, the KASUMI input being selected during the first round and a stored KASUMI round circuit output from the memory being selected during subsequent rounds.

2. The apparatus of claim 1, further comprising a sub-key generator for generating sub-keys for the KASUMI round circuit based on the key.

3. The apparatus of claim 1, wherein the apparatus is adapted to be operable in an access point.

4. The apparatus of claim 1, wherein the apparatus is adapted to be operable in an access terminal.

5. The apparatus of claim 1, wherein the apparatus is adapted to be operable in a W-CDMA system.

6. A KASUMI round circuit for receiving a 64-bit input and producing a 64-bit output comprising:
    an FO circuit having an FO output;
    an FL circuit having an FL output;
    an XOR gate having a first XOR operand, a second XOR operand, and an XOR output;
    a first register having a first register output;
    a second register, having a second register output, the second register receiving the XOR output, the second register output being concatenated with the first register output to produce the 64-bit output;
    a first input mux having a first input mux output, the first input mux selecting between an upper half of the 64-bit input and the second register output, under control of an input select signal, the first input mux output being received at the first register;
    a second input mux having a second input mux output, the second input mux selecting between a lower half of the 64-bit input and the output of the first register under control of the input select signal, the second input mux output being delivered as the second XOR operand;
    a first datapath mux having a first datapath mux output, the first datapath mux selecting between the first input mux output and the FO output under control of a data flow signal, the first datapath mux output delivered to the FL circuit;
    a second datapath mux having a second datapath mux output, the second datapath mux selecting between the FL output and the first register output under control of the data flow signal, the second datapath mux output delivered to the FO circuit; and
    a third datapath mux having a third datapath mux output, the third datapath mux for selecting between the FL output and the FO output under control of the data flow signal.

7. An apparatus for receiving a 32-bit input and producing a 32-bit output, comprising:
    a first XOR gate having a first operand, a second operand, and a first XOR output, the first operand of the first XOR gate receiving a KO sub-key;
    an FI circuit having an FI input and an FI output, the FI input receiving the first XOR output;
    a second XOR gate having a first operand, a second operand, and a second XOR output, the first operand of the second XOR gate receiving the FI output;
    a first register having a first register output, the first register receiving the second XOR output;
    a second register having a second register input and a second register output;
    a first input mux having a first input mux output, the first input mux selecting between an upper half of the 32-bit input and the second register output under control of an input select signal, the first input mux output delivered to the second operand of the first XOR gate; and a second input mux having a second input mux output, the second input mux selecting between a lower half of the 32-bit input and the first register output under control of the input select signal, the second input mux output delivered as the second operand of the second XOR gate and delivered as the second register input, the second input mux output concatenated with the second XOR output to produce the 32-bit output.

8. An apparatus for receiving a 16-bit input and producing a 16-bit output, comprising:

a first register having a first register input and a first register output;

a second register having a second register input and a second register output;

a first input mux having a first input mux output, the first input mux selecting between the first register output and an upper nine bits of the 16-bit input under control of an input select signal;

a second input mux having a second input mux output, the second input mux selecting between the second register output and a lower seven bits of the 16-bit input under control of the input select signal;

an S9 circuit, having an S9 output, receiving the first input mux output;

a first XOR having a first operand, a second operand, and a first XR output, the first operand of the first XOR receiving the S9 output and the second operand of the first XOR receiving the zero-extended second input mux output;

an S7 circuit, having an S7 output, for receiving the second input mux output;

a second XOR having a first operand, a second operand, and a second XOR output, the first operand of the second XOR receiving the truncated first XOR output and the second operand of the second XOR receiving the S7 output, the second XOR output concatenated with the first XOR output to produce the 16-bit output;

a third XOR having a first operand, a second operand, and a third XOR output, the third XOR output delivered to the first register input, the first operand of the third XOR receiving a first KI sub-key, and the second operand of the third XOR receiving the first XOR output; and a fourth XOR having a first operand, a second operand, and a fourth XOR output, the fourth XOR output delivered to the second register input, the first operand of the fourth XOR receiving a second KI sub-key, and the second operand of the fourth XOR receiving the second XOR output.

9. A method for performing KASUMI ciphering on a KASUMI input, having an upper half and a lower half, to produce a KASUMI output, comprising:

generating a select signal in a calculation controller for each of eight rounds;

selecting a calculation input in accordance with the select signal, wherein the KASUMI input is selected as the calculation input during the first round and a stored result is selected as the calculation input in subsequent rounds;

calculating a partial result in a KASUMI round circuit with the selected calculation input; storing the partial result as the stored result in a memory; and delivering the stored result as the KASUMI output after eight partial results are stored.

10. The method of claim 9, wherein the calculating step comprises:

when the round is odd:
performing an FL function on an upper half of the selected calculation input to produce an FL output;
performing an FO function on the FL output to produce an FO output; and
XORing the FO output with a lower half of the selected calculation input to produce an XOR output;

when the round is even:
performing the FO function on an upper half of the stored result to produce the FO output;
performing the FL function on the FO output to produce the FL output; and
XORing the FL output with a lower half of the stored result to produce the XOR output;

delivering as the partial result the XOR output concatenated with the upper half of the selected calculation input.

11. The method of claim 9, further comprising generating sub-keys for each round.

12. A method for performing an FO function comprising:

for each of three stages:
selecting an input as a calculation input in the first stage;
selecting a stored result as the calculation input in subsequent stages;
calculating a partial result with the selected calculation input;
storing the partial result as the stored result in memory; and delivering the partial result as the output.

13. The method of claim 12, wherein the calculating step comprises:

XORing an upper half of the selected calculation input with a sub-key to form a first XOR result;
performing an FI function on the first XOR result to form an FI result;
XORing the FI result with a lower half of the selected calculation input to form a second XOR result; and
delivering as the partial result an upper half of the selected calculation input concatenated with the second XOR result.

14. A method for performing an FI function comprising:

calculating a first partial result with a partial result circuit using an input;
XORing the first partial result with a sub-key to form an XORed partial result;
storing the XORed partial result in a memory as a stored result;
calculating a second partial result with the partial result circuit using the stored result; and
delivering the second partial result as the output.

15. The method of claim 14, wherein the partial result circuit is operable to perform the following:

performing an S9 function on an upper nine bits of the input or stored result;
zero extending a lower 7 bits of the input or stored result;
XORing the zero-extended input or stored result with the output of the S9 function to form a first XOR result;
performing the S7 function on the lower 7 bits of the input or stored result;
truncating the XOR result;
XORing the truncated first XOR result with the output of the S7 function to form a second XOR result; and
delivering as the partial result the second XOR result concatenated with the first XOR result.

* * * * *